Aug. 22, 1967  R. DRAKE  3,337,231
STEERING MEANS FOR LIFT TRUCKS
Filed March 1, 1965  5 Sheets-Sheet 3
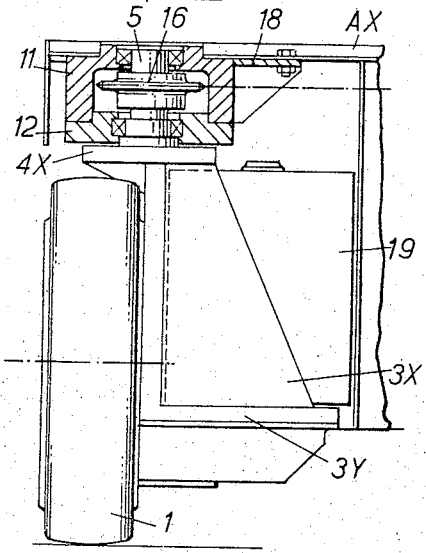
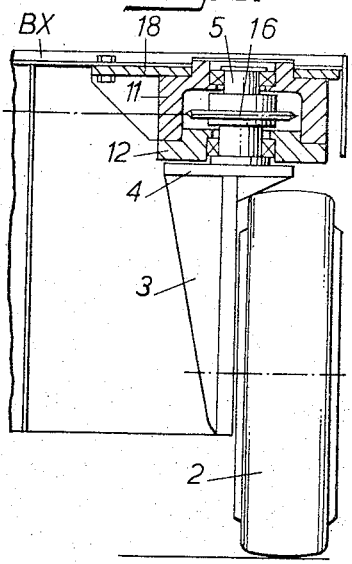
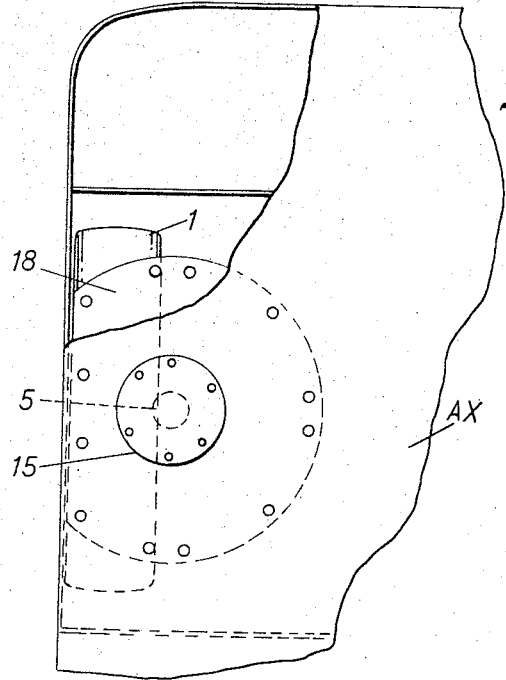

United States Patent Office 3,337,231
Patented Aug. 22, 1967

3,337,231
STEERING MEANS FOR LIFT TRUCKS
Ronald Drake, Churwell, near Leeds, England, assignor to Joshua Shaw & Sons Limited, Yorkshire, England
Filed Mar. 1, 1965, Ser. No. 435,985
Claims priority, application Great Britain, Mar. 7, 1964, 5,226/64
1 Claim. (Cl. 280—91)

This invention relates to steering means for forklift or other forms of lift trucks having at least one pair of front wheels and one pair of rear wheels. Such trucks require to be particularly manoeuvrable over the ground in order to operate in confined spaces and to enable them to load from and unload onto positions which may be difficult to approach.

With a view to giving such a truck a high degree of manoeuvrability with ease of steering control, it is proposed according to this invention to provide steering mechanism for at least one front and one rear pair of ground wheels of which one pair at least is driven, said mechanism comprising one or more endless chains or equivalent flexible transmission elements passing around chainwheels or the like associated with the supports for said wheels and arranged to transmit the steering action from the streering wheel or the like to said ground wheels so as to turn one pair in the opposite direction to the other pair. By this means the ground wheels may be turned through any desired angle within the limits of the mechanism similar to castor wheels but under positive control, and they can enable the truck to be manoeuvred in almost any direction.

If a truck has its driven wheels steerable through at least 90° it may even be moved sideways. Each ground wheel may be independently driven by electric or hydraulic motors mounted on each wheel or axle, and this may permit each wheel to be steered through 180° or more.

In order that the invention may be fully and clearly comprehended the same will now be described with reference to the accompanying drawings which illustrate by way of example the application of the invention to a four-wheeled truck of the side-loading kind and having the two rear wheels independently driven. In said drawings:

FIGURE 3 is a section taken on the line III—III in FIGURE 1 showing the mounting for one of the steerable and driven front wheels;

FIGURE 4 is a plan of the mounting of FIGURE 3;

FIGURE 5 is a section taken on the line V—V in FIGURE 1 showing the mounting for one of the steerable rear wheels, the plan view of which would appear similar to that of FIGURE 4;

Figure 1:
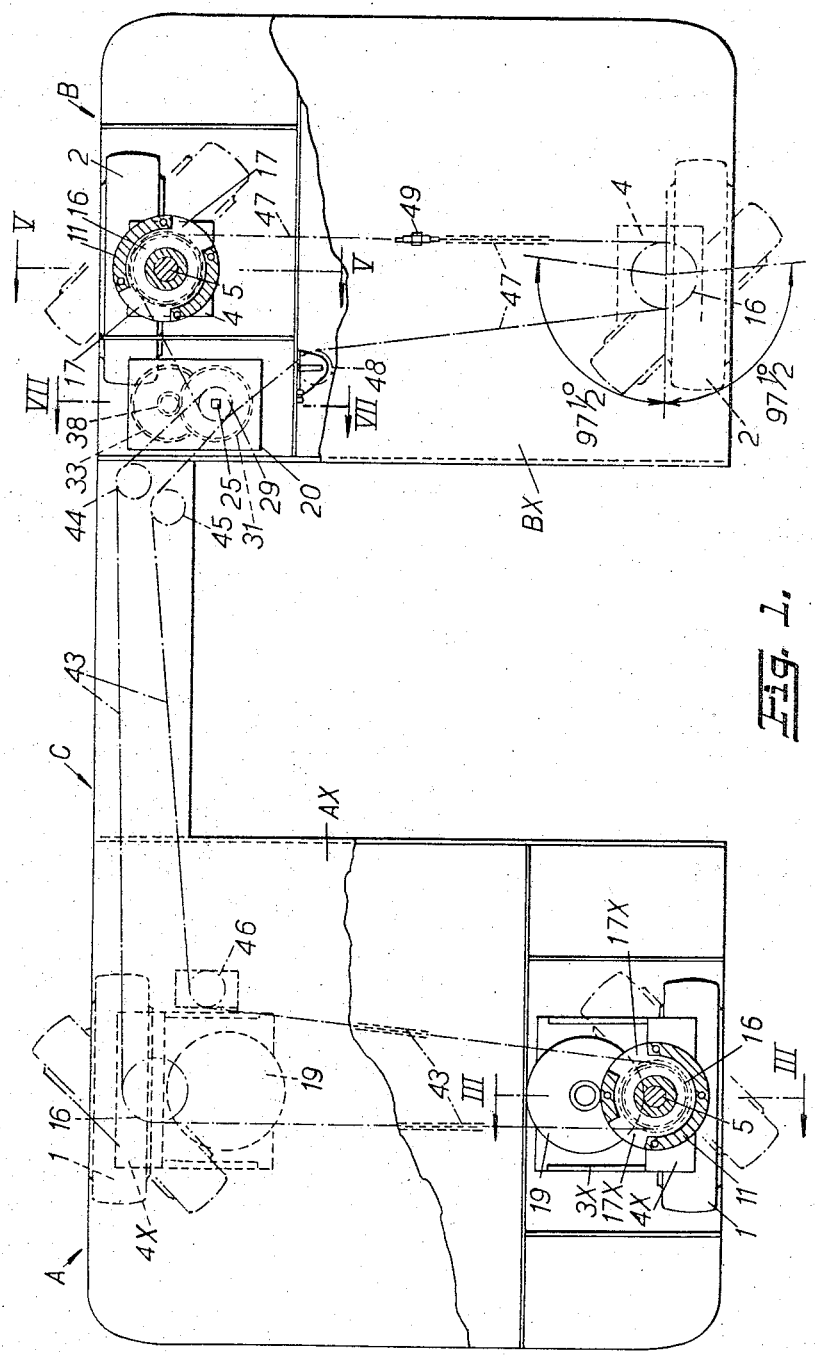
FIGURE 1 is a plan of the truck chassis with the steering column and driver's seat removed and with parts of the load-supporting deck cut away to show internal details.
Figure 2:
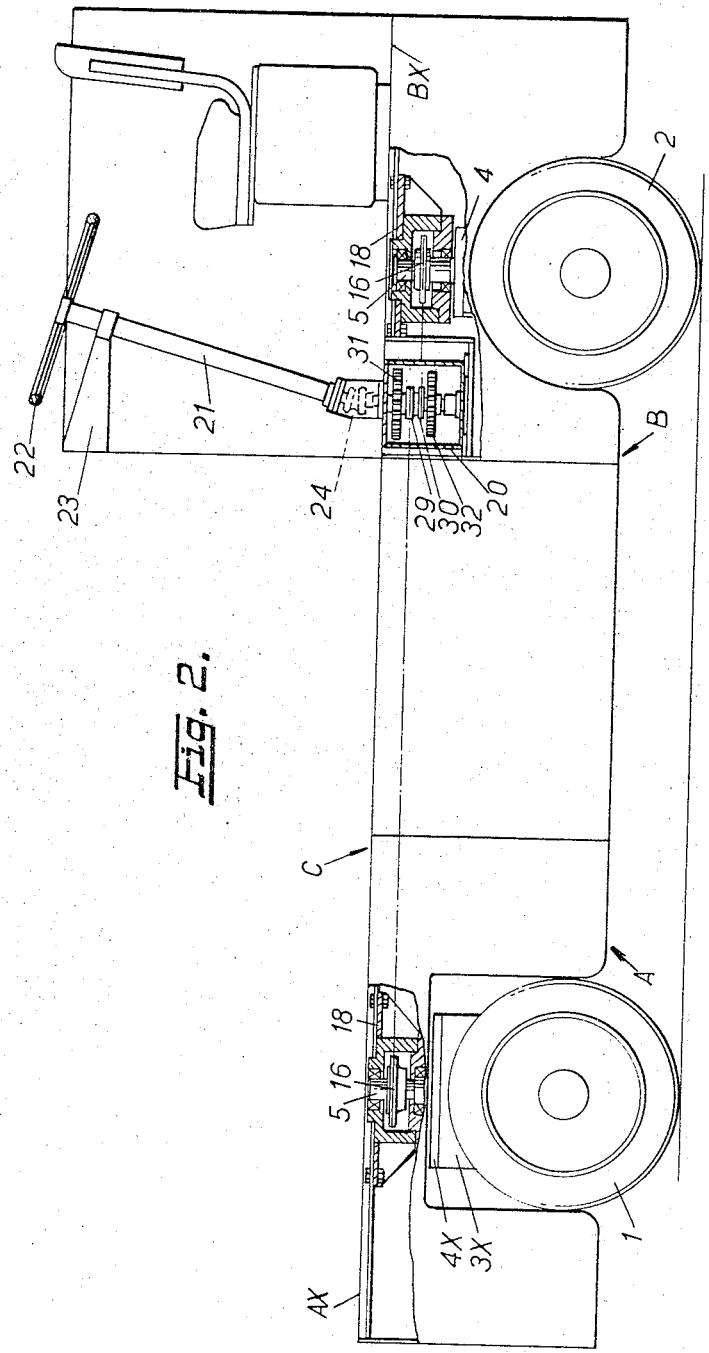
FIGURE 2 is a side elevation corresponding to FIGURE 1 with parts of the side panels cut away to show internal details in vertical cross section.
Figure 6:
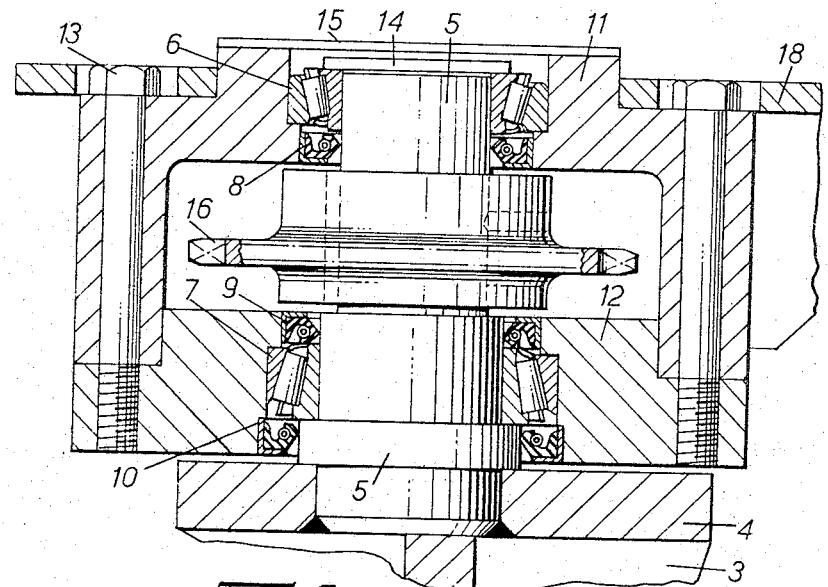
FIGURE 6 is an enlarged view of the upper part of a rear wheel mounting similar to that in FIGURE 5 but showing more detail.
Figure 7:
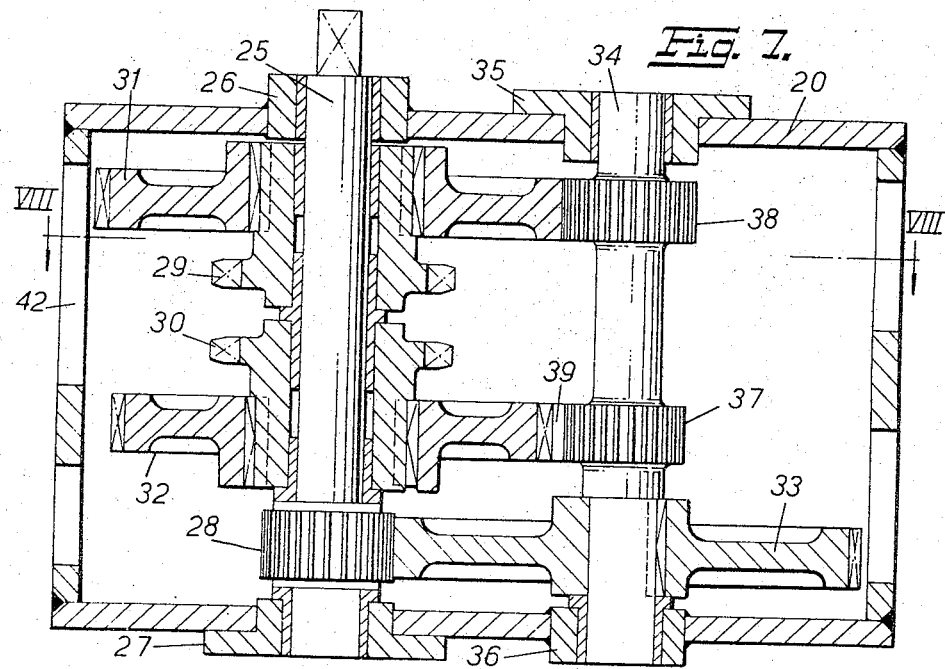
FIGURE 7 is a cross-section to an enlarged scale through the steering box and taken on the line VII—VII in FIGURE 1.
Figure 8:
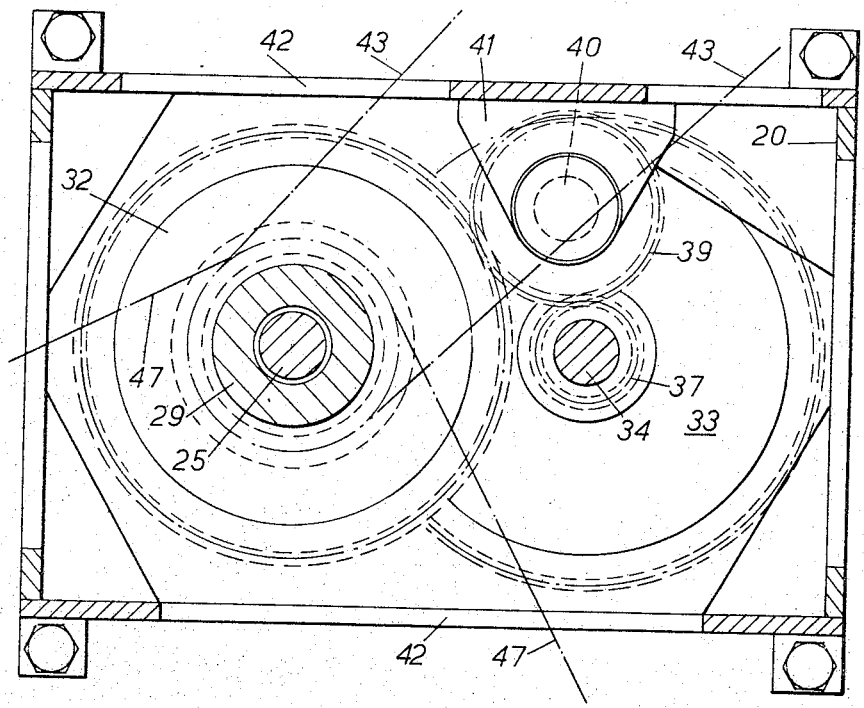
FIGURE 8 is a cross-section taken on the line VIII—VIII in FIGURE 7.

The lift truck chassis illustrated in the drawings is of the side-loaded kind, having front and rear portions A, B joined at one side by a narrow centre portion C which leaves a recess open at the other side, this recess being arranged for accommodating the lifting mechanism which can be moved in and out of the recess for loading and unloading, there being flat decks or platforms AX, BX to receive the load deposited thereon by the lift mechanism. All the above-mentioned features are well known and form no part of the present invention.

This chassis is supported upon two front wheels 1, 1, and two rear wheels 2, 2, all of which are independently mounted and all steerable in unison. The rear wheels are not driven but each one is freely journalled in a swivel bracket 3 having a top flange 4 to which is welded or otherwise secured a pivot pin 5. This pin is of several different diameters and is journalled by upper and lower taper roller bearings 6, 7 with oil seals, 8, 9, 10 in upper and lower bearing housings 11, 12 which are held together by bolts 13. A plug nut 14 holds the upper bearing in place and a cover plate 15 is secured to the housing 11.

A chainwheel 16 is keyed on the pin 5 within the housings 11, 12, the housing 11 having side openings 17 as shown in FIGURE 1 for the passage of a chain passing round the chain wheel. The upper bearing housing 11 has welded or otherwise secured to it a part-circular mounting plate 18 by which it is bolted to the under-side of the deck BX.

The front wheels are mounted on the truck chassis by substantially the same means as those used for the rear wheels, and like reference numbers are used on the drawings for like parts. The exceptions are that the swivel bracket 3X has a bottom flange 3Y and supports a motor 19 for driving the associated wheel. The motor and its transmission connections to the wheel form no part of this invention, but they will be such as to permit the whole assembly to turn about the pivot pin 5. The chain wheels 16 are at a higher level than those in the rear assemblies and the openings 17X are differently located as shown in FIGURE 1. Also the swivel bracket top flange 4X is longer than flange 4.

On the rear portion B of the chassis is secured a steering box 20, and above it is a steering column 21 and steering wheel 22 supported in a bracket 23. The foot of the column is connected through a universal joint 24 to a vertical input shaft 25 mounted by bushes in bush housings 26, 27 in the box 20. A pinion 28 is secured on shaft 25 and two chainwheels 29, 30 of the same size are rotatably mounted by bushes on the shaft. Secured on the bosses of these chainwheels are spur gears 31, 32.

The pinion 28 meshes with a spur gear 33 secured on a vertical lay shaft 34 mounted by bushes in bush housings 35, 36 in the box 20 and this shaft has formed on it two pinions 37, 38. Pinion 38 meshes with spur 31, but pinion 37 meshes with an idler gear 39 which in turn meshes with gear 32, whereby one chainwheel rotates in the opposite direction to the other when the steering wheel is turned. Gear 39 is mounted on a stud shaft 40 supported in a bearing bracket 41 secured to the box 20. The numbers of teeth on the gears is chosen to produce the same degree of rotation (but in opposite directions) of the two chain wheels. Openings 42 are provided in the walls of the box 20 for passage of chains.

One endless chain 43 passes around wheel 29 and the two front chainwheels 16, being guided by guide pulleys 44, 45 and 46 so as to run beneath the centre portion C of the chassis and so leave the recess in the deck unobstructed. Another endless chain 47 passes around wheel 30 and the two rear chainwheels 16 with the aid of guide pulley 48. Pulleys 46 and 48 are adjustable to tension the chains each of which is made endless by a releasable fastening 49.

Figure 9:
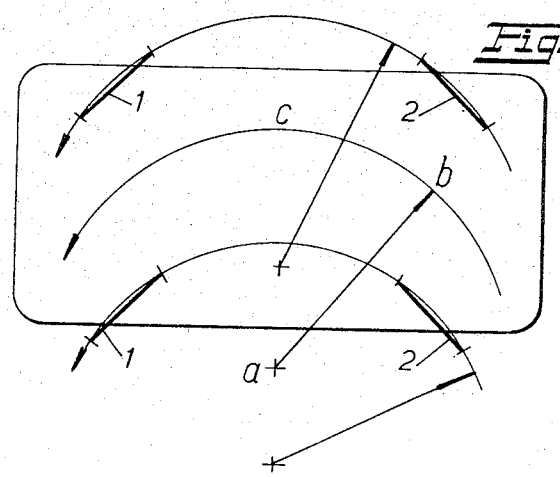
FIGURE 9 is a diagram illustrating the action and effect of the steering means according to the invention.

It will be seen that when the steering wheel is turned the two front wheels, each with its whole independent driving assembly, will be turned through a desired angle as indicated (for example) by the broken line positions of the wheels in FIGURE 1, and simultaneously the two rear wheels will be turned through the same angle but in the opposite direction. The resultant movement of the truck is indicated in FIGURE 9 which shows how the rear of the truck swings in a curve to the right as the front swings to the left, thereby bringing the truck as a whole onto the newly selected line of travel more quickly than would be done with front or rear steering only, and without the rear of the truck "cutting in" as it follows the front. In FIGURE 9 the line a–b indicates the mean radius of the two paths followed by the near side and offside wheels and c indicates the resultant path of the truck.

The amount of turning movement provided for is preferably not less than 195°, giving 97½° on each side of the straight-ahead position, as indicated for one of the rear wheels in FIGURE 1. Thus by turning the wheels through 90° the truck may be driven sideways; or it may be turned sharply into a narrow passage or aisle as may be desired when working in a congested warehouse or store room.

Since all the wheel mountings must be capable of pivoting freely as well as carrying considerable loads which may amount to several tons, and since the mountings for the driven wheels have also to carry the weight of the motor and to withstand the strains of acceleration and deceleration, the construction and attachment to the chassis of these wheel mountings is important.

Preferably the ratio between the movement of the steering wheel 22 and that of the wheels 1 and 2 is of the order of thirty to one, and the sizes of gears and chainwheels will be chosen to achieve some such ratio in order to give ease of steering control.

It will be understood that a positive belt and pulley steering transmission could be used instead of chains. Also a single chain or belt might be used instead of two separate ones as above described, provided it is crossed or otherwise arranged to turn one pair of wheel mountings in the opposite direction to that of the other.

Although the truck illustrated in the drawings has its driven wheels at the front, they could be at the rear or all four wheels could be driven whilst still obtaining the advantages of manoeuvrability and ease of steering control as explained above which is particularly advantageous for side-loading trucks. These advantages apply whether the truck be driven forwards or backwards.

I claim:

A steering mechanism for a vehicle comprising a chassis, a pair of front steerable ground wheels and a pair of rear steerable ground wheels mounted at the front and rear ends of the chassis, mounting means for each wheel comprising a bracket on which the wheel is journaled, a pivot pin secured to the bracket, a bearing housing secured to the chassis having spaced walls, bearing means supported by said spaced walls to receive the pivot pin whereby each wheel is pivotally mounted on the chassis, a motion transmitting element secured to the portion of the pivot pin located between the spaced walls, a first flexible motion transmitting means connecting the motion transmitting element on the pivot pin of one front wheel to the motion transmitting means on the pivot pin on the other front wheel, a second flexible motion transmitting means connecting the motion transmitting element on the pivot pin of a rear wheel to the motion transmitting element on the pivot pin of the other rear wheel, a steering control means, gearing means interconnecting the steering control means with the first flexible transmission means to move the front wheels jointly in one direction, and gear means interconnecting the steering control means with the second flexible transmission means to move the rear wheels jointly in the opposite direction of the front wheels, said motion transmitting elements secured to the pivot pins are sprocket wheels and said flexible transmission mean are endless sprocket chains in engagement therewith; and said steering control means and gearing means comprise a gear casing, two parallel shafts carried by opposite walls of the casing, a steering wheel connected to one of said shafts, a plurality of sprocket wheels rotatably carried on said one shaft, a first gear secured to said one shaft, three additional gears secured to the other of said shafts, the first of said three gears engaging said first gear on said one shaft, the second of said three gears engaging one of said sprocket wheels of said plurality of sprocket wheels and the third of said three gears interconnecting another of said plurality of sprocket wheels through an idling gear, with each of the sprocket wheels on said one shaft engaging one of the sprocket chains.

References Cited

UNITED STATES PATENTS

| | | | |
|---|---|---|---|
| 2,715,534 | 8/1955 | Hoge et al. | 280—91 X |
| 2,834,605 | 5/1958 | McCollough | 280—91 |
| 3,067,839 | 12/1962 | Gibson | 280—91 X |
| 3,087,564 | 4/1963 | Quayle | 280—91 X |
| 3,090,516 | 5/1963 | Seymour et al. | 280—91 X |

FOREIGN PATENTS 871,358  6/1961  Great Britain.

A. HARRY LEVY, *Primary Examiner.*